Aug. 15, 1961  E. A. TERHUNE  2,996,316
FRANGIBLE SECURING MEANS
Filed March 4, 1960
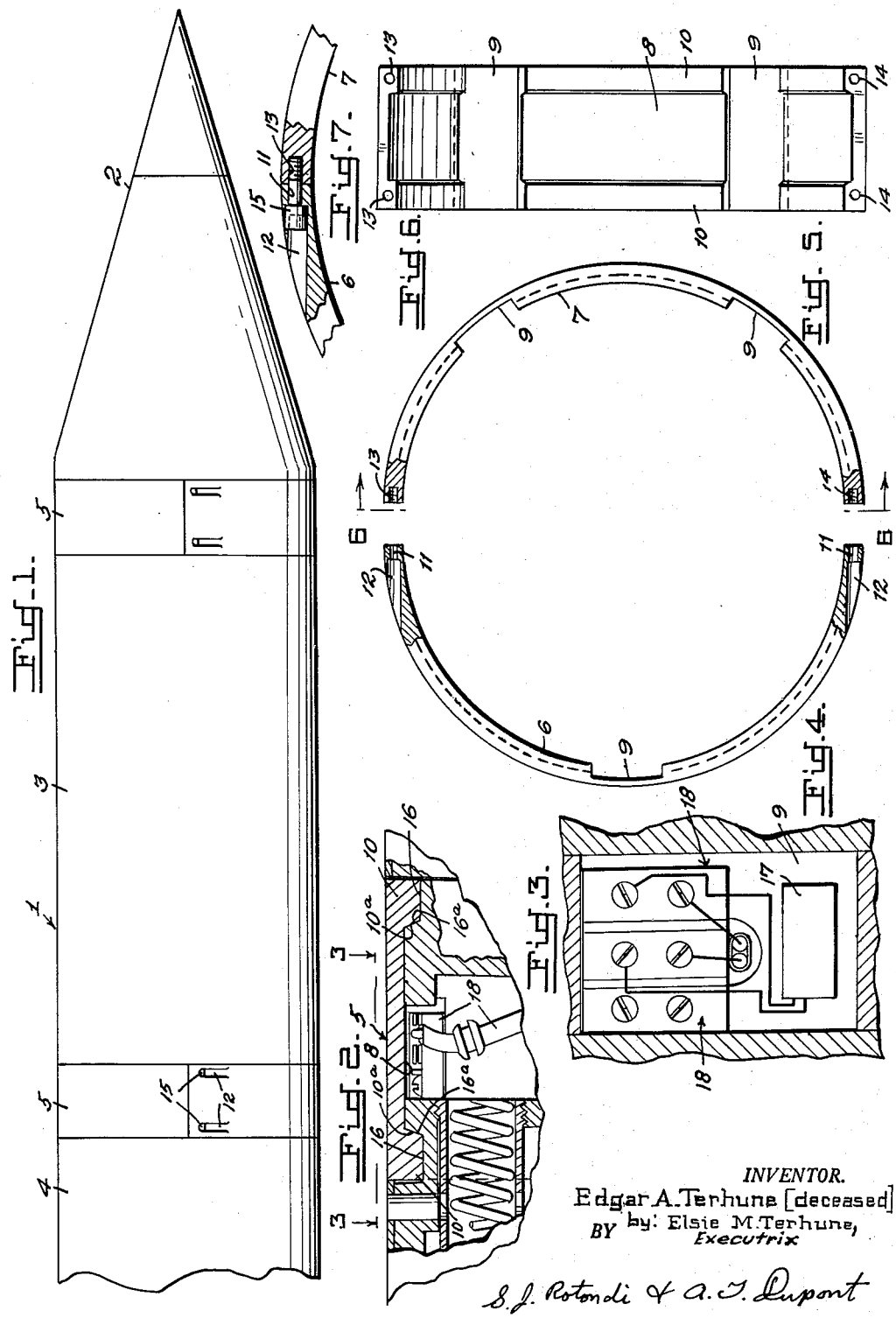
INVENTOR.
Edgar A. Terhune [deceased]
BY by: Elsie M. Terhune,
Executrix 2,996,316
FRANGIBLE SECURING MEANS
Edgar A. Terhune, deceased, late of Little Silver, N.J., by Elsie M. Terhune, executrix, Little Silver, N.J., assignor to the United States of America as represented by the Secretary of the Army
Filed Mar. 4, 1960, Ser. No. 12,878
1 Claim. (Cl. 285—4)
(Granted under Title 35, U.S. Code (1952), sec. 266)

The invention described herein may be manufactured and used by or for the Government for governmental purposes without the payment of any royalty thereon.

This invention relates to a frangible securing means and more particularly an equally divided ring for securing two bodies together and capable of being fractured by detonators for separation of the bodies.

Rings of this type are usually employed in multi-stage rocketry and are generally used to separate one propellant motor after it has burnt out. However, the ring of the invention has varied uses such as the release of parachute canopies, or other ejection devices where the separation of two or more bodies is desired.

However, separation means heretofore used presented the problem of adequate streamlining. Explosive bolts and other means did not lend a smooth flush surface with a projectile's outer skin. Also such devices were bulky and heavy.

The present invention is designed to eliminate these difficulties by means of a ring divided into two halves, which may be held together by four cap screws. The ring is milled out in at least three sections to weaken it and provide space for an electric detonator. The combined reduced areas are sufficient in strength to withstand the rocket flight loading, yet weak enough to break from the concentrated force of the detonator.

A fracture of any one weakened section of the ring will allow separation, but the fracture of all weakened sections simultaneously and even though one fracture occurs, it still will be sufficient to separate the ring from the rocket.

It is therefore a primary object of this invention to provide a frangible ring that is weakened in at least three areas and will separate upon rupture of at least one of the areas.

It is another object to provide a frangible ring for separating two bodies wherein the ring, though weakened in at least three areas, the combined reduced areas are still sufficient in strength to withstand rocket flight loading, yet weak enough to break from the concentrated force of the detonator.

It is a further object to provide a frangible ring made in two halves and held together by at least four cap screws.

Still another object is to provide a separable ring for a rocket or the like, the outer diameter of the ring being the same as the outer skin of the rocket and to present a smooth unbroken surface therewith.

A still further object of the invention is to provide a frangible ring having at least three areas milled out to provide weakened portions, each being shaped to accommodate a detonator.

The specific nature of the invention as well as other objects and advantages thereof, will clearly appear from a description of a preferred embodiment as shown in the drawings in which:

FIG. 1 is a partial elevation of a rocket having multistage motors, the motors being held together by the frangible rings of the invention;

FIG. 2 is a partial section taken through a portion of a rocket and taken in a plane transversely of the frangible ring;

FIG. 3 is a fragmentary view looking in the direction along the lines 3—3 of FIG. 2, the outer skin of the rocket being broken away;

FIG. 4 is a side elevation of one-half of the ring with parts broken away;

FIG. 5 is a view similar to FIG. 4 of the other half of the ring;

FIG. 6 is a view of the inner face of one-half of the ring and looking in the direction of the arrows of FIG. 5; and FIG. 7 is an enlarged fragmentary sectional view of the ring halves held together by cap screws.

In the drawings, FIG. 1, 1 represents a rocket, generally having a nose 2 and separate rocket stage motors 3 and 4. Motors 3 and 4 are shown as being held together by frangible rings indicated generally by 5.

Rings 5 are constructed in halves 6 and 7, as best viewed in FIGS. 4 and 5. Ring halves 6 and 7 are shown as milled along their inner peripheral surfaces (see FIG. 6), to define a channel 8 and thickened edge portions 10. Channel 8 is provided with beveled side walls 10a.

Each ring half is also milled transversely as at 9 to a depth somewhat greater than the floor of channel 8. (Three milled areas altogether are shown.) The inner faces of edges 9 and half 6 are bored as at 11 and counterbored as at 12. The inner faces of half 7 are provided with threaded bores 13 and 14. Bores 11, 12, 13 and 14 receive cap screws 15 as is illustrated in FIG. 7.

The stage motors 3 and 4 are shaped at their respective ends to provide seating of the ring halves 6 and 7 so that a flush surface between the motor and the rings will be presented when the rings are assembled. As is shown in FIG. 2, a portion of the body of each motor is milled as at 16 to provide keyways 16 having beveled inner side walls 16a for edge portion 10 to fit in.

As seen in FIGS. 2 and 3, an electric detonator 17 and its necessary electrical components 18 are housed in each milled portion 9.

The ring halves 6 and 7 are placed about the ends of two rocket motors 3 and 4 by placing the edge portion 10 in channels 16, beveled side walls 10a and 16a acting to permit easy fitting therein. A cap screw 15 is inserted in the bores 11 and 12 and screwed into threaded bore 13 and the halves with the detonators 17 in the weakened portion 9 are tightened.

It is intended that when the motor 4 is about burnt out, the three detonators 17 will explode simultaneously to fracture the ring 5 and cause separation of motor 4, which will drop off and motor 3 can take over and sustain the flight of rocket 1. If only one detonator is fired, the resulting force will still be sufficient to fracture the ring and cause separation of motor 4 from the rocket assembly.

As many stage motors can be attached as is desired, only two being shown herein for purpose of illustration.

From the foregoing, it is apparent that a novel separation ring has been devised that will present a smooth surface with the outer skin of a rocket or the like and is capable of sufficient strength to secure the rocket components together in flight yet is quickly fractured to allow separation of the components upon explosion of one detonating element.

Variations and modifications may be effected without departing from the scope of the novel concept of the present invention, and the following claim is intended to include such variations and modifications.

What is claimed is:

A fitting comprising two adjacent bodies secured together by a frangible means, each of said bodies including an annular keyway having a beveled inner side wall on the side nearest the adjacent end of each of said bodies, and a wall perpendicular to the axis of said bodies opposite said beveled inner side wall, a bisected ring having a channel along its entire inner peripheral surface and having a width whereby a thickened edge is formed along each side of said channel for engagement with said keyway in each body and the outer peripheral surface of said ring is flush with the outer peripheral surface of said bodies, said channel having beveled inner walls engaging and conforming with each of said beveled inner side walls of said bodies, said bisected ring having side walls that are perpendicular to the axis of said bisected ring, there being at least three weakened areas in said ring for receiving a destructive means therein, and means to activate each of said destructive means simultaneously, said areas being transversely disposed at spaced points along the entire inner peripheral surface of said ring, said areas being of a depth greater than said channel, said weakened areas being so designed as to withstand operational stresses and strains but capable of failure upon the simultaneous detonation of each of said destructive means, and means carried by the end faces of said thickened edges for the securement of the ring sections in abutting relation, said last named means comprising a threaded bore in the end face of each thickened edge of one of the ring sections, a smooth bore in the end face of each thickened edge of the other section, there being a smooth counterbore between the smooth bore and the outer peripheral surface of the aforesaid ring section and a cap screw received in each smooth bore and said counterbore for threadable engagement in each threaded bore in the other ring section.

References Cited in the file of this patent

UNITED STATES PATENTS

| | | |
|---|---|---|
| 1,875,985 | Brandt | Sept. 6, 1932 |
| 2,166,412 | Kiesel | July 18, 1939 |
| 2,543,673 | Searle | Feb. 27, 1951 |
| 2,809,584 | Smith | Oct. 15, 1957 |